June 19, 1951  R. BECKERMAN ET AL  2,557,590
GYROSCOPICALLY CONTROLLED HEADLAMP
Filed Nov. 2, 1948  2 Sheets-Sheet 1
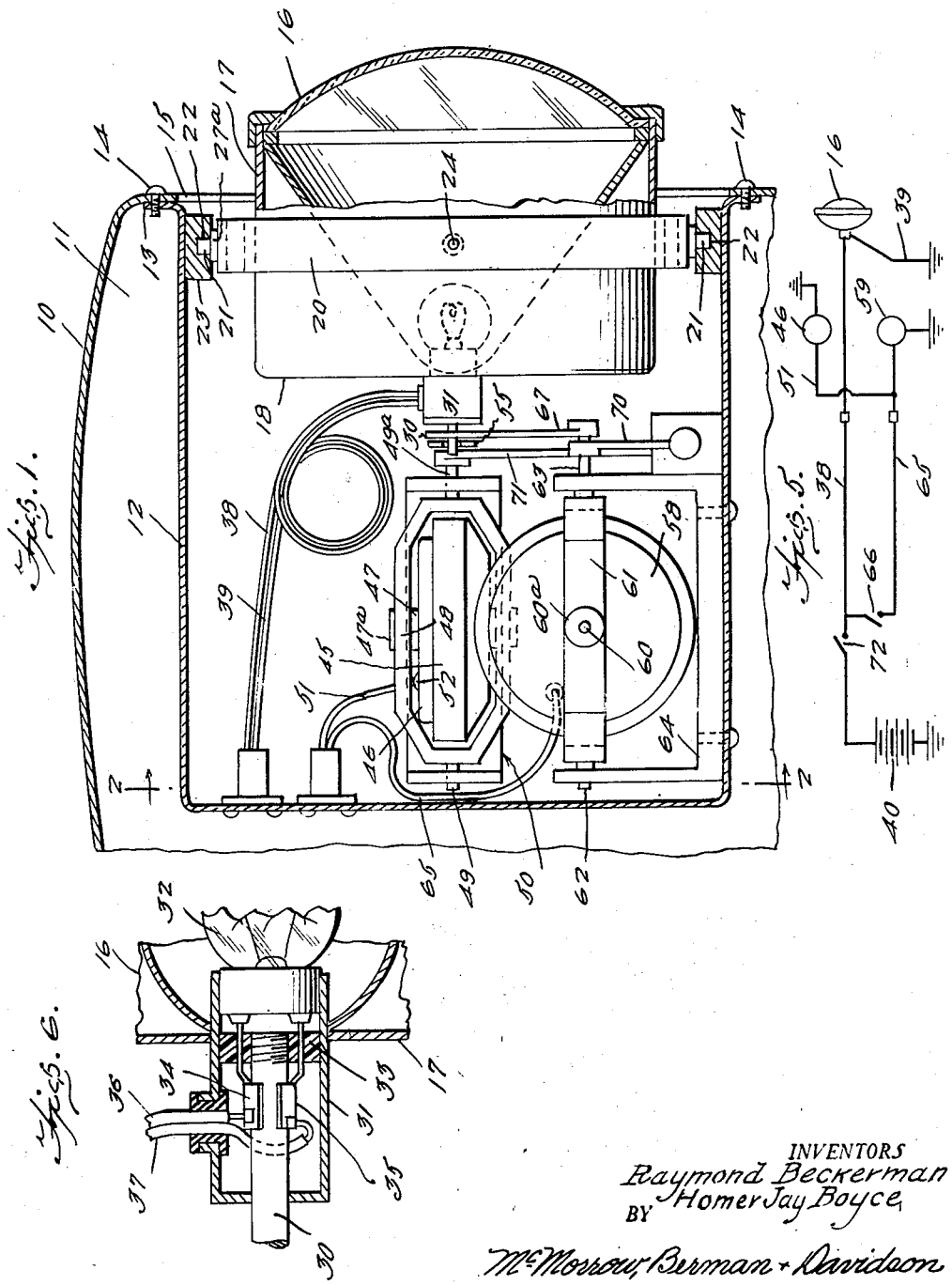
INVENTORS
Raymond Beckerman
Homer Jay Boyce
BY
McMorrow, Berman + Davidson
ATTORNEYS

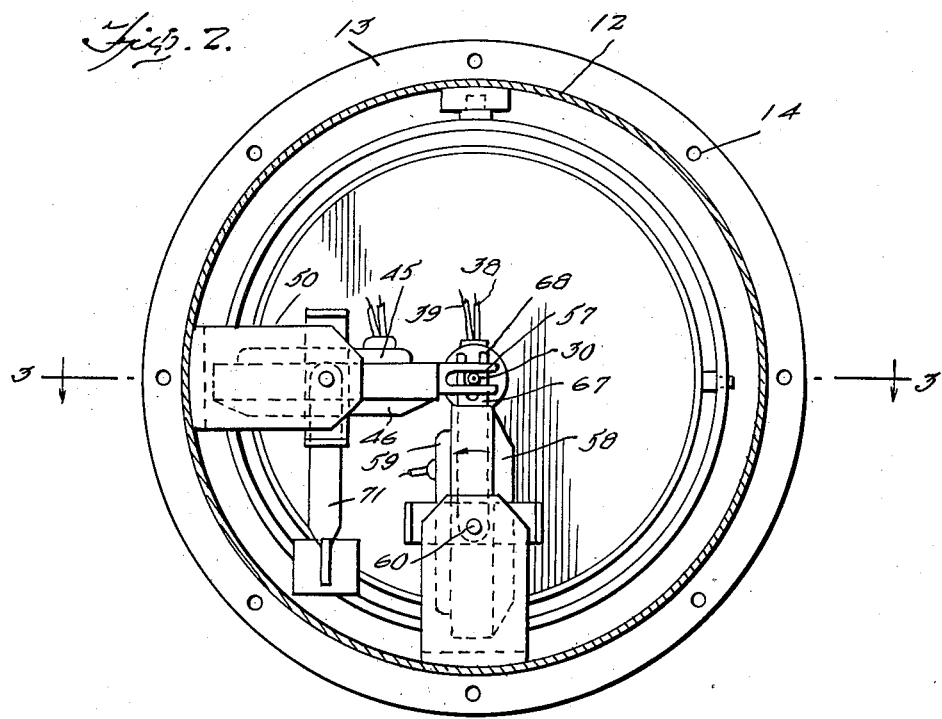
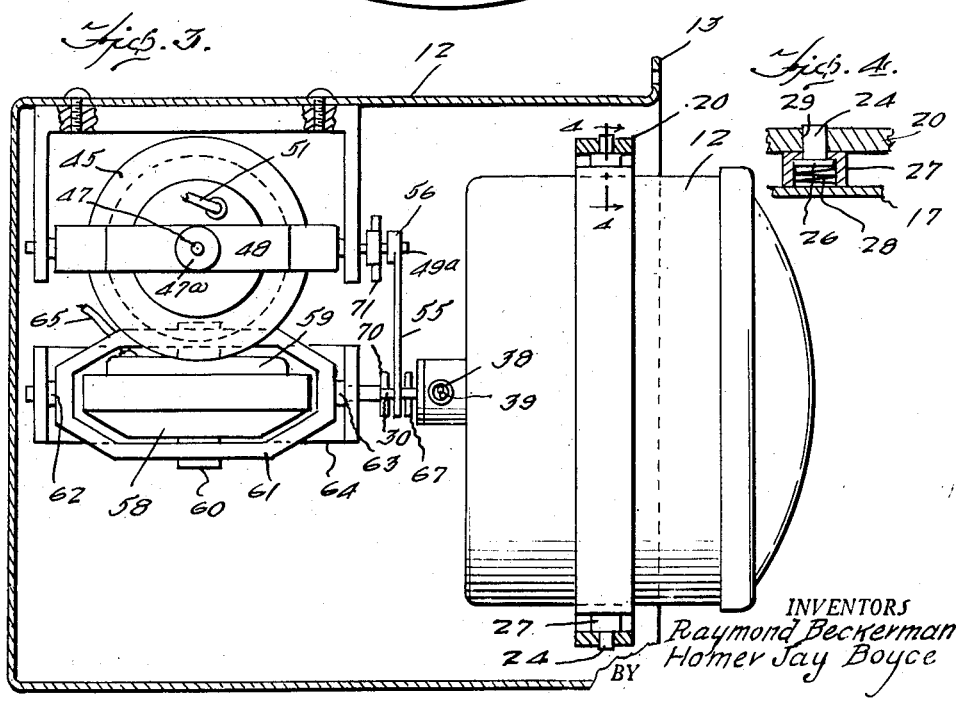
INVENTORS
Raymond Beckerman
Homer Jay Boyce

Patented June 19, 1951 2,557,590

UNITED STATES PATENT OFFICE 2,557,590

GYROSCOPICALLY CONTROLLED HEAD LAMP

Raymond Beckerman and Homer J. Boyce, Danbury, Conn.

Application November 2, 1948, Serial No. 57,992

3 Claims. (Cl. 240—62)

This invention relates to gyroscopically controlled headlamps for vehicles.

An object of the invention is the provision of an apparatus for changing the position of the axis of a headlamp to compensate for the varying positions of the longitudinal axis of a vehicle so that when the vehicle is traveling up or down a hill or turning on a curve, the positions of the horizontal axis of the headlamps will be changed to prevent light rays from the lamps from blinding the driver of an approaching vehicle, the constructions being such that one of a pair of electrically driven gyroscopes is active to maintain the beams of light rays from a headlamp in a downward position when the vehicle is traveling over the top of a hill while the other gyroscope causes the lamp to be oscillated in a horizontal plane for directing light rays along the side of a roadbed when the vehicle is turning.

A further object of the invention is the provision of an apparatus which is controlled by a gyroscope for causing the headlamps of a vehicle to tilt downwardly when the vehicle is traveling over the top of a hill and by a second gyroscope for causing the headlamp to be turned when the vehicle is rounding a curve, said gyroscopes cooperating to set into operation instrumentalities to provide a composition of oscillations of the headlamp during combined variations in the travel of the vehicle on an inclined and curving path, two gyroscopes and associated actuated means being employed for each lamp.

The invention is best understood from a consideration of the following detailed description in connection with the accompanying drawings. Nevertheless, it is to be borne in mind that the invention is not confined to the disclosure but is susceptible of such changes and modifications as shall define no material departure from the salient features of the invention as expressed in the appended claims.

In the drawings—

Figure 1 is a longitudinal vertical section of our apparatus for controlling the oscillation of a headlamp along its longitudinal axis thereof in planes which are at right angles to each other.

Figure 2 is a transverse vertical section taken along the line 2—2 of Figure 1,

Figure 3 is a longitudinal horizontal section taken along the line 3—3 of Figure 2, Figure 4 is an enlarged fragmentary vertical section of a bearing for a support of the headlamp, Figure 5 shows more or less diagrammatically electric circuits for a headlamp and a pair of motors for revolving gyroscopes, and Figure 6 is an enlarged fragmentary longitudinal vertical section of the inner end of a headlamp and its socket.

Referring more particularly to the drawings 10 designates the fender of an automobile having a wall 11 for the reception of a housing 12. Said housing has an outer peripheral flange 13 secured at 14 to a circular portion of the fender embracing an opening 15 therein.

A lamp 16 which may be of the sealed beam type is mounted in a cylindrical casing 17 having the inner end 18 closed. A ring 20 has diametrically disposed pins 21 disposed in a vertical plane so that the ring may rock on its vertical axis. The pins are mounted in bearings 22 in an annular support 23 secured to the inner wall of the housing 12 adjacent the open front end thereof. It will be noted also that the casing 17 has diametrically disposed pins 24 received by bearings located in a horizontal plane and formed in the ring 20 so that the casing and lamp 16 may be rocked on a horizontal axis. It will be appreciated that the above construction will permit not only the rocking of the lamp along a vertical axis and along a horizontal axis but also the rocking movements may be combined.

The pins 21 and 24 have a special and an identical construction as shown in Figure 4. The pins have an integral flange 26 seated within a cup-shaped member 27. A coil spring 28 presses against the flange for retaining the pin in the bearing 29 in the ring 20. The cup-shaped members 27 which house the pins 24 have the open ends thereof welded to the casing 17 while the cup-shaped members 27a which house the pins 21 have their open ends welded to the ring 20.

A rod 30 projects axially through a socket 31 for the lamp bulb 32 and is threaded into an insulating ring 33 fitted into the socket against turning. Wires leading to the lamp 32 are secured to contacts 34 and 35 attached to the rod 30 and insulated therefrom. Wires 36 and 37 are connected between the contacts 34 and 35 and the respective positive side 38 and negative side 39 of a source of current 40.

A gyroscope 45 including a built-in electric motor 46 has a vertical axle 47 which has its ends mounted in diametrically opposite bearings 47a in gimbal 48. Said gimbal has a pintle 49 in a bearing in an arm of a U-shaped bracket 50. A pintle 49a is rigid with the gimbal and has a bearing in the other arm of the bracket. The gyroscope spins freely in the gimbal. An electric wire 51 has a contact 52 with the motor 46 and is in circuit with the source of current 40. The gyroscope 45 is rotated freely at high speed in a horizontal plane and tends to maintain this position regardless of the angular position of the vehicle when traveling over the crest of a hill. A lever 55 has one end 56 secured to the pintle 49a. The other end of said lever has a slot 57 forming a fork for receiving the rod 30.

A second gyroscope 58 is driven at high speed by an electric motor 59 incorporated therein. The horizontal motor shaft 60 has bearings 60a in a gimbal 61 and said shaft forms the axle for the gyroscope. Pintles 62 and 63 rigid with the gimbal at diametrically opposite points have bearings in the arms of a U-shaped bracket 64. A wire 65 from the motor leads to a switch 66. A lever 67 has one end secured rigidly to the pintle 63 while the other end is provided with a fork 68 receiving the rod 30. The pintle 63 is provided with a damping device 70 to prevent over-travel. The pintle 49a is also provided with a similar damping device 71.

As shown in Figure 5, the wire 38 includes a manually operated switch 72. The wire 51 is connected with the wire 65 so that both motors 46 and 59 will be in circuit when the switches 66 and 72 are closed. Both motors have a ground. The switch 72, however, may close the circuit to the lamp 16 independently of the motors.

The operation is as follows: The switches 72 and 66 are closed for lighting a single lamp 16 and energizing the motors 46 and 59. It will be appreciated that while one lamp and its associated operating mechanism are illustrated, there will be a headlamp and an operating mechanism in each front fender. As shown in Figure 1, the various elements are built into the housing 12 to form a removable unit.

The gyroscope 58 controls the horizontal oscillation of the lamp 16 when the vehicle is turning and responds to the angular rate of turning of the vehicle on a vertical axis. When the vehicle is making a right turn at any speed, the gyroscope, due to precession torque will tilt in the direction indicated by the arrow in Figure 2. This torque is sufficient to rock the lever 67 in the same direction for rocking the rod 30 and for shifting the lamp 16 to the right so that the light rays will follow the turn in the roadway. As the vehicle returns from the curve and travels along a straight path, the various elements will assume normal positions. When the vehicle turns left the opposite rocking of the gyroscope will turn the lamp 16 to the left.

The gyroscope 45 controls the direction of the light rays from the lamp 16. When the vehicle reaches the crest of a hill and starts to move downwardly, the gyroscope is disturbed in its plane of rotation thereby causing the gimbal 48 to be tilted so that the free end of the lever 55 is raised for elevating the inner or free end of the rod 30. The lamp 16 is tilted downwardly so that the light rays will be projected toward the roadbed and thus prevent blinding of an oncoming motorist. The rate of the speed of the moving elements of the gyroscope 45, and likewise the gyroscope 58, is proportional to the vertical tilting rate or to the horizontal turning rate of the vehicle.

The damping means 70 and 71 are illustrated as a conventional type and any well-known form of means may be employed. Such damping means will tend to stabilize the gyroscopes and will prevent over-travel of the lamps 16 when rocked on the pivots 21 and 24.

What is claimed is:

1. A vehicle headlamp comprising a relatively stationary support, a lamp housing having its longitudinal axis in a horizontal position and mounted on said support to pivot relative thereto on transverse vertical and horizontal axes, a pair of motor driven gyroscopes mounted in gimbal rings journalled on said support having parallel horizontal axes of rotation, said gimbal rings having rigid levers projecting radially with respect to their axes of rotation and in parallel vertical planes, one of said gyroscopes rotating on a vertical axis parallel to the vertical pivotal axis of said lamp housing and the other on a horizontal axis parallel to the horizontal pivotal axis of said lamp housing, said levers having free ends intersecting the longitudinal horizontal axis of said lamp housing, an element on said lamp housing, and means operatively connecting the free ends of said levers to said element.

2. A vehicle headlamp comprising a relatively stationary support, a lamp housing having its longitudinal axis in a horizontal position and mounted on said support to pivot relative thereto on transverse vertical and horizontal axes, a pair of motor driven gyroscopes mounted in gimbal rings journalled on said support having parallel horizontal axes of rotation, said gimbal rings having rigid levers projecting radially with respect to their axes of rotation and in parallel vertical planes, one of said gyroscopes rotating on a vertical axis parallel to the vertical pivotal axis of said lamp housing and the other on a horizontal axis parallel to the horizontal pivotal axis of said lamp housing, said levers having free ends intersecting the longitudinal horizontal axis of said lamp housing, an element on said lamp housing, and means operatively connecting the free ends of said levers to said element, said element being positioned on the longitudinal axis of said lamp housing.

3. A vehicle headlamp comprising a relatively stationary support, a lamp housing having its longitudinal axis in a horizontal position and mounted on said support to pivot relative thereto on transverse vertical and horizontal axes, a pair of motor driven gyroscopes mounted in gimbal rings journalled on said support having parallel horizontal axes of rotation, said gimbal rings having rigid levers projecting radially with respect to their axes of rotation and in parallel vertical planes, one of said gyroscopes rotating on a vertical axis parallel to the vertical pivotal axis of said lamp housing and the other on a horizontal axis parallel to the horizontal pivotal axis of said lamp housing, said levers having free ends intersecting the longitudinal horizontal axis of said lamp housing, an element on said lamp housing, and means operatively connecting the free ends of said levers to said element, said element comprising a rod, and said means comprising slots in the free ends of said levers defining parallel edges slidably engaging opposite sides of said rod.

RAYMOND BECKERMAN.
HOMER JAY BOYCE.

REFERENCES CITED

The following references are of record in the file of this patent:

UNITED STATES PATENTS

| Number | Name | Date |
| --- | --- | --- |
| 583,916 | Marchand | June 18, 1897 |
| 1,398,262 | Gray | Nov. 29, 1921 |
| 2,321,337 | Tostevin | June 8, 1943 |
| 2,431,641 | Gregorie et al. | Nov. 25, 1947 |
| 2,434,766 | Herrington | Jan. 20, 1948 |

FOREIGN PATENTS

| Number | Country | Date |
| --- | --- | --- |
| 616,248 | Germany | Aug. 1, 1935 |